(12) United States Patent
Dhuri et al.

(10) Patent No.: US 8,979,021 B2
(45) Date of Patent: Mar. 17, 2015

(54) HYDRAULIC AIR BLEED VALVE SYSTEM

(75) Inventors: Sanjeev N. Dhuri, Pune (IN); Udaykumar P. Dere, Pune (IN)

(73) Assignee: Easton Corporation, Cleveland, OH (US)

( * ) Notice: Subject to any disclaimer, the term of this patent is extended or adjusted under 35 U.S.C. 154(b) by 144 days.

(21) Appl. No.: 13/274,379

(22) Filed: Oct. 17, 2011

(65) Prior Publication Data
US 2013/0092266 A1  Apr. 18, 2013

(51) Int. Cl.
| B64C 13/30 | (2006.01) |
| F15B 1/26 | (2006.01) |
| B01D 19/00 | (2006.01) |
| F15B 21/04 | (2006.01) |

(52) U.S. Cl.
CPC .............. *F15B 1/26* (2013.01); *B01D 19/0063* (2013.01); *F15B 21/044* (2013.01)
USPC .............................. 244/78.1; 137/12; 137/486

(58) Field of Classification Search
USPC ................ 244/78.1, 226, 99.5, 99.6, 104 FP; 137/455, 197, 198, 199, 200, 183
See application file for complete search history.

(56) References Cited

U.S. PATENT DOCUMENTS

| 3,006,580 | A | * | 10/1961 | Clarkson | 244/78.1 |
| 3,027,121 | A | * | 3/1962 | Griswold, II | 244/78.1 |
| 3,708,139 | A | * | 1/1973 | Wheeler | 244/3.13 |
| 4,494,841 | A | * | 1/1985 | Marcus | 396/207 |
| 4,524,793 | A | | 6/1985 | Silverwater | |
| 4,538,228 | A | * | 8/1985 | Brearey et al. | 701/70 |
| 4,813,446 | A | | 3/1989 | Silverwater et al. | |
| 5,033,694 | A | * | 7/1991 | Sato | 244/78.1 |
| 6,047,720 | A | | 4/2000 | Stein | |
| 6,086,041 | A | * | 7/2000 | Gattuso et al. | 251/129.06 |
| 7,075,216 | B1 | * | 7/2006 | Vetelino | 310/338 |
| 7,637,458 | B2 | * | 12/2009 | Near et al. | 244/78.1 |
| 7,739,909 | B2 | * | 6/2010 | Heise et al. | 73/290 V |
| 7,825,568 | B2 | * | 11/2010 | Andle | 310/333 |
| 7,913,955 | B2 | * | 3/2011 | Jones | 244/226 |
| 8,235,027 | B2 | * | 8/2012 | Guterres et al. | 123/516 |
| 8,297,589 | B2 | * | 10/2012 | Dourdeville et al. | 251/129.19 |
| 8,379,887 | B2 | * | 2/2013 | Kasai et al. | 381/174 |
| 2004/0163621 | A1 | * | 8/2004 | Stockner et al. | 123/322 |
| 2004/0168516 | A1 | * | 9/2004 | Kent | 73/579 |

(Continued)

OTHER PUBLICATIONS

"Acoustic Wave Sensors: Design, Sensing Mechanisms and Applications," M. Hoummandy et al. Jul. 9, 1997; Smart Mater. Struct 6 (1997) 647-657. UK 0964-1726/97/060647+11; Copyright 1997 IOP Publishing Ltd.

(Continued)

*Primary Examiner* — Christopher P Ellis
*Assistant Examiner* — Medhat Badawi
(74) *Attorney, Agent, or Firm* — Rader, Fishman & Grauer PLLC

(57) ABSTRACT

An air bleed valve having a housing with hydraulic fluid therein and a first acoustic wave sensor mounted within the housing so as to be covered in the hydraulic fluid and a second acoustic wave sensor mounted within the housing so that it can detect when air is present in the housing sufficient to be vented outside upon the opening of an air vent valve and where both the first acoustic wave sensor and the second acoustic wave sensor and the air vent valve are electrically connected to a air bleed controller. In a preferred embodiment, the first and second acoustic wave sensors are of the type known as a shear horizontal surface acoustic sensor.

20 Claims, 3 Drawing Sheets

(56) References Cited

U.S. PATENT DOCUMENTS

| | | | |
|---|---|---|---|
| 2005/0029369 A1* | 2/2005 | Nagaoka et al. | 239/558 |
| 2006/0283252 A1* | 12/2006 | Liu et al. | 73/649 |
| 2009/0039534 A1* | 2/2009 | Ooyachi et al. | 261/36.1 |
| 2010/0012192 A1* | 1/2010 | Dourdeville et al. | 137/1 |
| 2010/0319791 A1* | 12/2010 | Dirkin et al. | 137/455 |
| 2011/0068656 A1* | 3/2011 | Lee et al. | 310/313 C |
| 2011/0184590 A1* | 7/2011 | Duggan et al. | 701/2 |
| 2011/0236877 A1* | 9/2011 | Yao et al. | 435/4 |
| 2012/0123628 A1* | 5/2012 | Duggan et al. | 701/24 |
| 2012/0199698 A1* | 8/2012 | Thomasson et al. | 244/175 |
| 2012/0320195 A1* | 12/2012 | Tener et al. | 348/139 |
| 2013/0200248 A1* | 8/2013 | Polzer et al. | 248/550 |
| 2013/0277460 A1* | 10/2013 | Omeri | 239/585.1 |

OTHER PUBLICATIONS

Applications of Acoustic Wave Devices for Sensing in Liquid Environments; Jeanne Hossenlopp; Applied Spectroscopy Reviews, vol. 41, No. 2 (Mar.-Apr. 2006), DOI: 10.1080/05704920500510745.

* cited by examiner

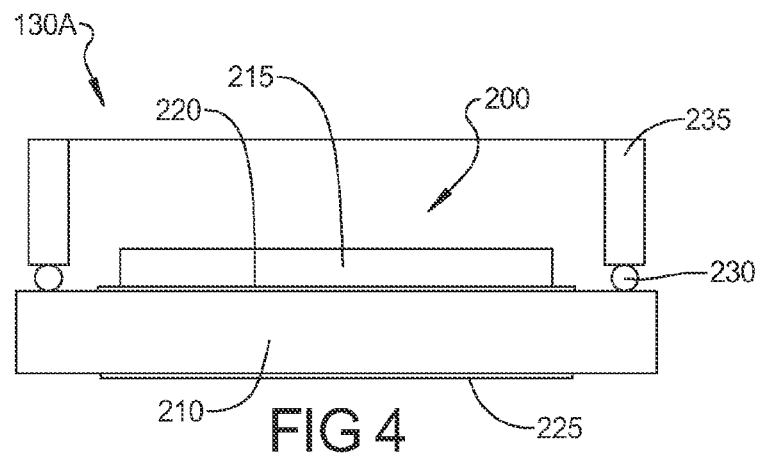
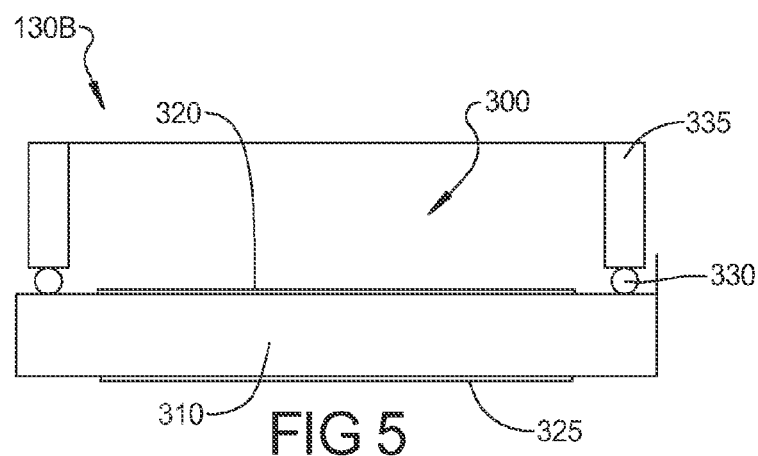
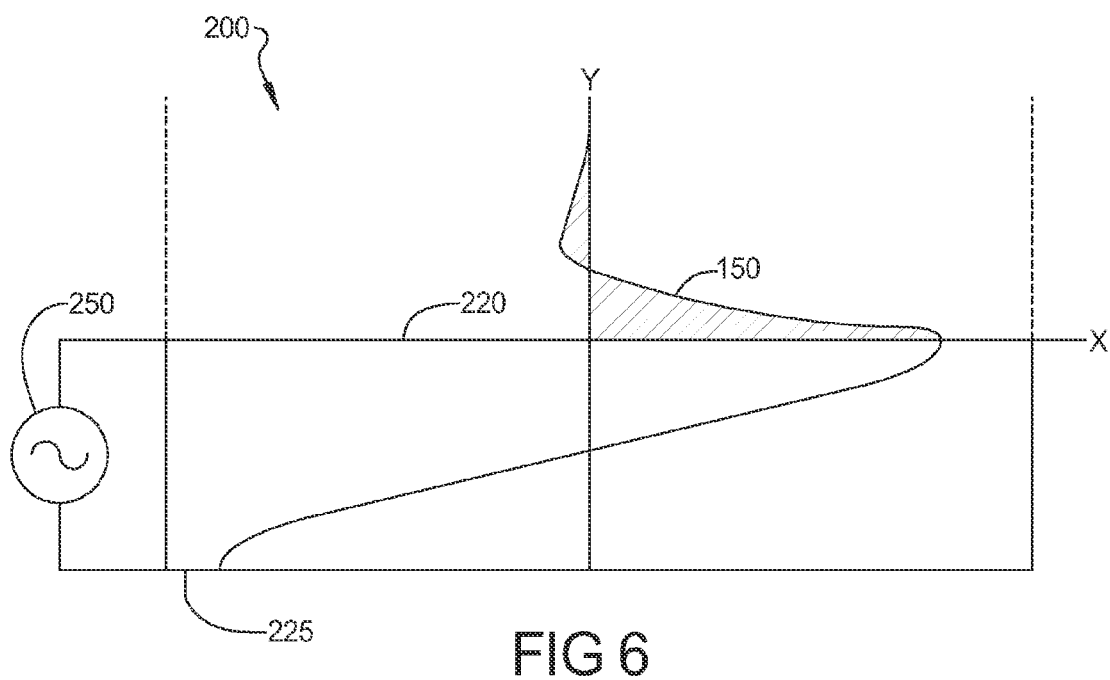

HYDRAULIC AIR BLEED VALVE SYSTEM

TECHNICAL FIELD

The exemplary hydraulic air bleed valve system relates to an air bleed valve that is activated based on signals from an acoustic wave sensor(s).

BACKGROUND

Air bleed valves are used in aircraft hydraulic systems to remove unwanted air from the hydraulic circuit prior to the operation of the high pressure hydraulic system to prevent unexpected and unwanted operational anomalies. Due to certain flight regimes, a traditional air bleed valve cannot be used in certain high performance aircraft, primarily those aircraft used in military applications. High G loads and inverted flight modes do not allow the air in the hydraulic system to be bled when experiencing these flight regimes. Therefore it is necessary to use sensors to determine when there is air in the hydraulic system and then electronically open an air vent valve to discharge the air when the aircraft is flying in a suitable flight mode. Traditional air bleed valves are usually bled when the pilot manually triggers the vent valve circuit. Sensors can be used in the air bleed valve such as a light emitting diode and a photoelectric diode to indicate that there is air in the hydraulic system and then send a signal to the pilot that the air vent in the air bleed valve needs to be activated. Pub. No. US 2010/0319791 A1 to Dirkin et al. disclose such a system. In the Dirkin system two LEDs and a phototransistor and three transparent windows are used to sense the presence of air. When air is detected by an electronic circuit which is connected to the phototransistor and the LEDs, a signal is sent to the flight deck so that the vent valve can be activated. This system is subject to several operational limitations involving clouding of the windows and failure of the phototransistor.

Other bleed air systems known in the art include those shown in U.S. Pat. Nos. 4,524,793 and 4,813,446 to Silverwater et al. These prior art devices provide for the automatic bleeding of air at the time of hydraulic pump start up only using differential pressure between the air and the hydraulic oil to move a piston to control the bleeding process. This system is self activating and is not controlled by the flight crew or an electronic control system so the air is automatically vented whenever it is present irrespective of the aircraft flight mode. This presents a problem in high performance aircraft since the air cannot be vented in certain flight regimes. Also, this type of air bleed valve is not as reliable or dependable as what is needed in the industry for use in high performance aircraft.

SUMMARY

The exemplary electronically controlled air bleed valve system provides for a robust solution for bleeding air from a hydraulic system whenever the level of air in a plenum exceeds a set level that is measured with the use of one or more acoustic wave sensors. One sensor can be located to set the characteristic wave propagation transfer function when submerged in oil while a second sensor can be located at the minimum allowable level of air allowed within the hydraulic plenum. An electronic control system processes the signals generated by the acoustic wave sensors and uses these to determine if the vent valve should be opened to allow the air to be bled from the hydraulic system. The vent valve can be a solenoid valve or a MEMs type valve or other type of vent valve mechanism which can be activated quickly and with a relatively low electrical power requirement.

The use of acoustic wave sensors in an aircraft air bleed valve is new and offers several advantages including low cost, reliability, ease of installation, low maintenance, accuracy and expanded functionality. In addition, this type of advanced sensor can be used as an integral part of a prognostic health management system. The acoustic wave sensor(s) can be one of several different types and configurations but the preferred version is that known in the art as a Shear Horizontal Surface Acoustic Wave (SH-SAW) device. This type of device works particularly well in the present air bleed valve system to sense the presence of air in hydraulic oil based system and can result in a more compact packaging which is easier to place within the aircraft.

The exemplary air bleed valve system is particularly adaptable for use in aircraft in that the air can be accurately sensed and then vented when the aircraft is in a suitable flight regime. When connected to a flight control system, operation can be automatic instead of manual. The exemplary system is mounted at the highest point where the air in hydraulic system is collected and will bleed air effectively even during flight without manual intervention and will not allow fluid leakage from the pressurized hydraulic reservoir even when the aircraft is in a high G or inverted orientation. The use of acoustic wave sensors in the air bleed valve provides more accurate and dependable venting of the air in the hydraulic system. These acoustic wave sensors are reliable and relatively inexpensive compared to prior art sensors. The output of the acoustic wave sensors can be electrically connected to an electronic circuit such as a computer so that input and output signals can be processed and used to control when an activation signal is sent to the vent valve for discharge of the excess air in the hydraulic system. Or, the sensors can be electrically connected to a stand-alone circuit that controls the air bleed valve. This circuit can communicate with a flight computer system that signals when the aircraft is in a flight mode that is conducive to the opening of the vent valve.

BRIEF DESCRIPTION OF THE DRAWINGS

FIG. 4 is a cross-sectional view of a test apparatus including an acoustic wave sensor;

FIG. 5 is a cross-sectional view of a test apparatus including an alternate embodiment of an acoustic wave sensor;

FIG. 6 is a graph of the response of the acoustic wave sensor shown in FIG. 4.

DETAILED DESCRIPTION

Figure 1:
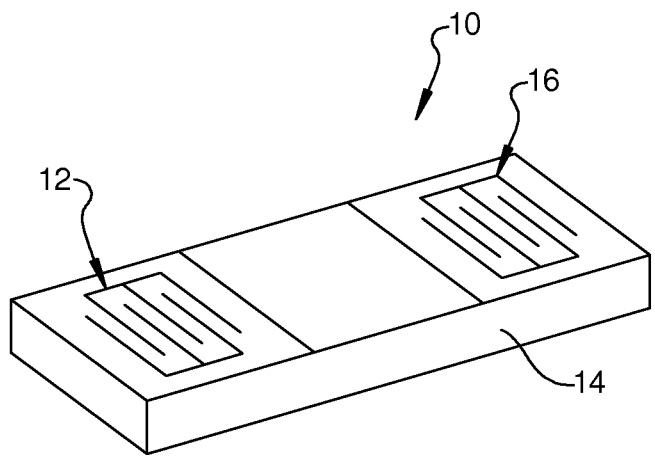
FIG. 1 is a perspective view of a first embodiment of an acoustic wave sensor.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a perspective view of a first embodiment of an acoustic wave sensor 10 that can sense hydraulic oil characteristics and utilizes a configuration known as a Shear Horizontal Surface Acoustic Wave (SH-SAW) device. An input transducer 12 is formed on the surface of the piezoelectric substrate 14 using a suitable thin film process and in a similar fashion; an output transducer 16 is also formed on the surface of the piezoelectric substrate 14 using a thin film process such as a photolithographic technology that is well known in the art. An electrical signal is provided to the input transducer 12 that will generate acoustic wave that propagates to the output (receiving) transducer 16 which generates an electrical signal that can be used to determine the properties of a fluid, such as hydraulic oil, that surrounds the piezoelectric substrate 14. Any change in physical, chemical, biological or electrical properties of media in contact with the acoustic wave sensor will cause corresponding change in the oscillating frequency of the acoustic wave generated by the input transducer 12, the acoustic wave generated by the input transducer 12 which is sensed by the output transducer 16 which generates an output electrical signal which can be connected to an electric circuit or a computer. The same principle is used to detect the presence or absence of a liquid which can be achieved when the piezoelectric substrate contacts the liquid and/or the air that is present and surrounds the acoustic wave sensor.

Figure 2:
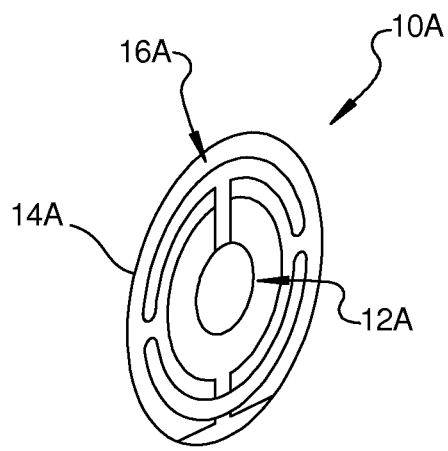
FIG. 2 is a perspective view of a second embodiment of an acoustic wave sensor.

Now referring to FIG. 2 of the drawings, a second alternative embodiment of the acoustic wave sensor 10A is shown. The acoustic wave sensor 10A is formed into a disc shape by reconfiguration of the input transducer 12A and the output transducer 16A into a partial nested hoop shape mounted on the piezoelectric disc 14A. This configuration is particularly adaptable to tight packaging situation where the object is to determine the properties of the media. The nested input and output transducers 12A, 16A provide for a compact geometry and reduce the cost of manufacture.

Figure 3:
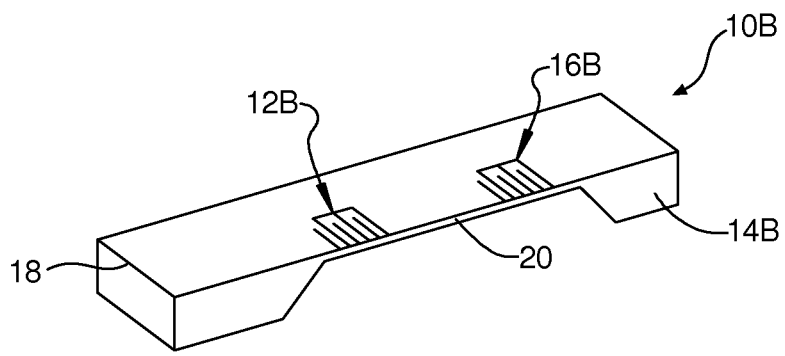
FIG. 3 is a perspective view of a third embodiment of an acoustic wave sensor.

Now referring to FIG. 3 of the drawings, a third alternative embodiment of the acoustic wave sensor 10B is shown in a perspective view. This sensor 10B is comprised of an input transducer 12B and an output transducer 16B which are formed using thin film or micromachining technology on the surface of a membrane 18 formed on the top of a piezoelectric layer 20 which is attached to a silicon substrate 14B.

Now referring to FIGS. 4-6 of the drawings, the structures and results of the testing of an acoustic wave sensor 130A, 130B are shown. FIG. 4 is a cross-sectional view of a test acoustic wave sensor 130a which consists of a fluid 200 covering a sensing film 215 which is formed on a first electrode 220 the assembly of which is bonded or formed using thin film techniques or otherwise attached to an AT quartz substrate 210. On the opposite side of the substrate 210 is a second electrode 225 which is formed or bonded or otherwise attached to the substrate 210. An o-ring 230 is used to seal a containment ring 235 to the substrate 210 and holds the test fluid 200 so that it contacts the sensing film 215.

FIG. 5 is a cross-sectional view of a test acoustic wave sensor 130b which consists of a fluid 300 covering a first electrode 320 which is attached to and AT quartz substrate 310. On the opposite side of the substrate 310 is a second electrode 325 which is formed on or bonded or otherwise attached to the substrate 310. An o-ring 330 is used to seal a containment ring 335 to the substrate 310 and holds the test fluid 300 so that it contacts the first electrode 320.

The acoustic wave sensor 130A shown in FIG. 4 was tested and the test results are shown in FIG. 6 in a cross-sectional view of the acoustic wave sensor 130A and of the shape of the actual acoustic wave as it exists in the sensor 130A. The first electrode 220 and the second electrode 225 are connected across a voltage source 250 which supplies an alternating signal at a frequency of approximately 25 to 500 MHz to the first and second electrodes 220, 225 to excite the acoustic wave sensor 130A to form the acoustic wave 150.

Acoustic wave sensors such as 10, 10A or 10B are typically surface acoustic wave (SAW) type devices and act as band pass filters in both the radio frequency and intermediate frequency sections of the transceiver electronics. New applications outside of the telecommunications market include uses for air pressure sensors, chemical sensors, and sensors for commercial applications such as the sensing of vapor, humidity, and temperature. Acoustic wave sensors are cost effective, rugged, sensitive and reliable when used in an air bleed valve and especially in an air bleed valve for use in an aircraft.

Acoustic wave sensors are so named because their method of detection depends on an acoustic wave that propagates through or on the surface of a supporting layer. As the acoustic wave propagates through or on the surface of the material, any changes to the characteristics of the propagation path affect the velocity and/or amplitude of the acoustic wave. Changes in velocity of the travelling acoustic wave can be monitored by measuring the frequency or phase characteristics of the wave which can then be processed by an electronic circuit or computer to output the character of the physical quantity being measured.

The acoustic wave sensors 10, 10A, 10B of the exemplary invention make use of a piezoelectric material to generate the acoustic wave. An oscillating electrical current at a frequency of approximately 25 to 500 MHz is supplied to the input transducer 12, 12A, 12B which creates a mechanical stress which propagates through the substrate and is then converted back to an electric field by the output transducer 14, 14A, 14B and then outputted to an electronic circuit or computer for processing.

The exemplary acoustic wave sensors 10, 10A or 10B can be effectively fabricated by means of a photolithographic process similar to that used to make integrated circuits. Among the various piezoelectric materials that can be used for acoustic wave sensors and devices, the most popular are quartz (SiO2), lithium tantalite (LiTaO3), and lithium niobate (LiNbO3). Each has their own unique characteristics such as cost, temperature effects, attenuation and propagation velocity.

The acoustic wave that propagates through the substrate is called a bulk wave. The most commonly used bulk acoustic wave (BAW) devices are the thickness shear mode (TSM) resonator and the shear-horizontal acoustic plate mode (SH-APM) sensor. If the wave propagates on the surface of the substrate, it is known as a surface wave. The most widely used surface wave devices are the surface acoustic wave sensor and the shear-horizontal surface acoustic wave (SH-SAW) sensor as used in the present is also known as the surface transverse wave (STW) sensor.

The acoustic wave devices can be used to sense many different physical parameters including gas but only a subset will work when in contact with liquids. The TSM, SH-APM and SH-SAW all generate waves that propagate primarily in the shear horizontal direction. The shear horizontal wave does not radiate significantly into liquids and thus, there is not significant damping of the wave by the liquid. This characteristic makes these particular acoustic wave devices suitable for use in liquids such as hydraulic oil of the exemplary air bleed system. The SH-SAW type of device is shown in the present exemplary acoustic wave sensing system (see FIGS. 1-3 and FIG. 7).

SAW type sensors have the highest sensitivity of the acoustic sensors described above and typically operate from 25 to 500 MHz. In the case of liquid sensing, a SH-SAW should be used in that the wave propagation mode changes from a vertical shear SAW sensor to a shear-horizontal SAW sensor which dramatically reduces loss when liquids, such as hydraulic oil, come into contact with the sensor. The damping effect of the liquid is significantly reduced with the SH-SAW sensor which makes it suitable for use when detecting the presence and characteristics of liquids such as hydraulic oil. The acoustic wave sensors 10, 10A, 10B are shown as a SH-SAW type device. The range of phenomena that can be detected by this device can be determined by the coating used on the device. These devices can detect the characteristics of gas or liquids by coating the device with a material that undergo changes when exposed to the gas or liquid of interest. Changes in the coating cause the propagation of the wave to be changed which can be used to calculate the characteristics of the gas or liquid. The presence or absence of a liquid can thus be easily detected. If the particular acoustic wave sensor is sensitive to temperature changes, a second acoustic wave sensor can be used, either mounted in a non-stressed area of the substrate or a physically separate device can be used to compensate for changes in temperature.

Figure 7:
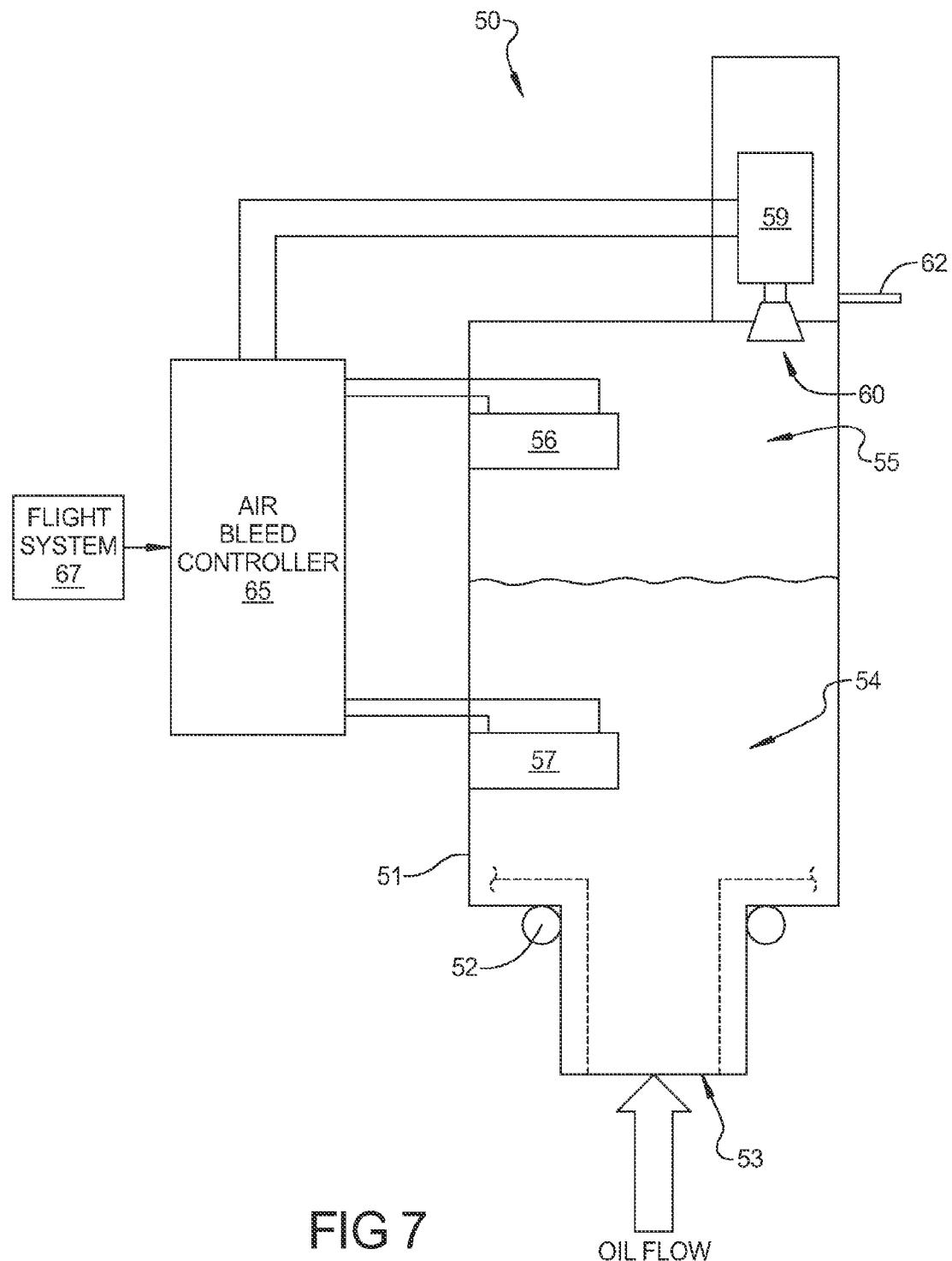
FIG. 7 is a cross-sectional view of the exemplary air bleed valve.

Now referring to FIG. 7 of the drawings, a cross-sectional view of the present exemplary air bleed valve system 50 is shown. The air bleed valve system 50 consists of a housing 51 which is connected to hydraulic reservoir and sealed with an O-ring 52 to prevent any external leakage. The hydraulic fluid 54 and the air within the hydraulic fluid 54 from the hydraulic reservoir will come in passage 53 and the air will be separated from the oil to form a volume 55. Two acoustic wave sensors 56 and 57 similar to either those shown in FIGS. 1-3 are mounted in the housing 51. The sensor 57 will be mounted in such a way that it will always be immersed in the hydraulic fluid 54 and acts as a temperature compensator. The sensor 56 is mounted at a predetermined height inside the housing 51 and works as a liquid sensing SH-SAW acoustic wave sensor. When it is submerged in oil, a vent valve 59 remains closed and when the sensor 56 signals that air is present in the volume 55, then the vent valve 59 is opened to vent the air out of the volume 55. Oil then replaces the air that is vented.

The output signals from sensors 56 and 57 are sent to an air bleed controller 65 which processes and then compares the two signals from sensors 56 and 57 respectively and uses the result to determine whether to close or open the vent valve 59. The controller 65 can be a separate circuit or part of a larger multi-functional processing circuit or it can be connected to a flight computer system 67. The vent valve 59 can be a solenoid valve or a piezo actuator type valve or a voice coil based actuator or any other type of open and closing valve device. The valve 59 closes or opens the passage 60 to allow the air to travel from the volume 55 into passage 60 from where the air can be bleed outside the system through bleed port 62. The vent valve 59 can be configured to be normally closed when no activation signal is present. The air bleed controller 65 is an electronic circuit that can include a microprocessor that is programmed to process the electrical signals from the acoustic wave sensors 56, 57. The bleed controller 65 then can send a signal to activate the vent valve 59 if air is present in volume 55 instead of hydraulic oil. The air is then released from the volume 55 and is replaced by hydraulic fluid. At this time the sensors 56 and 57 should generate approximately equivalent output signals and the controller 65 would remove the activation signal from the vent valve 59 and it would close. Optionally, a flight computer system 67 is connected to the bleed controller 65 to signal when the aircraft is operating in a mode which is conducive to the venting of air from the hydraulic system.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. An air bleed valve system for use in a hydraulic system comprising:
    a hydraulic oil reservoir to be at least partially filled with hydraulic oil;
    an air vent valve, said vent valve opening in response to receipt of an electronic control signal;
    a first acoustic wave sensor mounted within said hydraulic oil reservoir so as to be covered by said hydraulic oil;
    a second acoustic wave sensor mounted at a pre-determined position within said oil reservoir;
    an air bleed controller electronically connected to said first and second acoustic wave sensors and to said air vent valve for processing signals from said first and second acoustic wave sensors and then sending an electronic control signal to said air vent valve;
    wherein said air vent valve is a piezo actuator type valve, and said valve is normally closed.

2. The air bleed valve of claim 1 wherein either said first acoustic wave sensor or said second acoustic wave sensor is a SH-SAW acoustic wave sensor.

3. The air bleed valve of claim 1 wherein said first acoustic wave sensor or said second acoustic wave sensor is a disc having an input transducer and an output transducer formed into a partial nested hoop shape.

4. The air bleed valve of claim 1 wherein said first acoustic wave sensor and said second acoustic wave sensor are electrically connected to an air bleed controller.

5. The air bleed valve of claim 1 wherein said first acoustic wave sensor and said second acoustic wave sensor are electrically connected to a flight control system.

6. A method of controlling the venting of air out of an aircraft hydraulic system comprising:

measuring the characteristics of a hydraulic oil using a first acoustic wave sensor;

measuring the presence or absence of air in a cavity using a second acoustic wave sensor; and sending an opening command to an air vent valve when there is air present in said cavity and said aircraft is not in an adverse flight;

wherein said air vent valve is a piezo actuator type valve, and said valve is normally closed.

7. The method of controlling the venting of air out of an aircraft hydraulic system of claim 6 further comprising connecting said first acoustic wave sensor and said second acoustic wave sensor to an air bleed controller.

8. The method of controlling the venting of air out an aircraft hydraulic system of claim 6 further comprising connecting said first acoustic wave sensor and said second acoustic wave sensor to a flight controller system.

9. The method of controlling the venting of air out of an aircraft hydraulic system of claim 6 wherein said first and second acoustic wave sensors include an input transducer and a receiver transducer.

10. The method of controlling the venting of air out of an aircraft hydraulic system of claim 9 wherein said input transducers and receiver transducers are of a SH-SAW type.

11. An air bleed system for use in a hydraulic system in an aircraft comprising:

a hydraulic housing containing a hydraulic fluid;

a first acoustic wave sensor mounted within said housing so as to be submersed in said fluid;

a second acoustic wave sensor mounted within said housing at a location to detect when a given amount of air is present in said housing;

an air vent valve mounted to said housing and positioned such that the opening of said air vent valve will allow air contained to escape and the housing to fill with hydraulic fluid;

an air bleed controller electrically connected to said first acoustic wave sensor and to said second acoustic wave sensor and to said air vent valve where said air bleed controller processes signals from said first and second acoustic wave sensors and then sends a signal to open to said air vent valve;

wherein said air vent valve is a piezo actuator type valve, and said valve is normally closed.

12. The air bleed system of claim 11 further comprising a flight computer system electrically connected to said air bleed controller.

13. The air bleed system of claim 11 wherein said first and second acoustic wave sensors are of the type known as SH-SAW.

14. The air bleed system of claim 13 wherein said first and second acoustic wave sensors are discs having an input transducer and an output transducer formed into a partial nested hoop shape, the disc then bonded to a substrate.

15. The air bleed valve of claim 1 wherein said first and second acoustic wave sensors include an input transducer and a receiver transducer, and said input transducer and said receiver transducer are formed on a piezoelectric layer which is attached to a silicon substrate.

16. The method of claim 9 wherein said input transducer and said output transducer are formed on one of a piezoelectric substrate and a piezoelectric layer which is attached to a silicon substrate.

17. The air bleed system of claim 11 wherein said first and second acoustic wave sensors include an input transducer and a receiver transducer, and said input transducer and said receiver transducer are formed on a piezoelectric layer which is attached to a silicon substrate.

18. The air bleed system of claim 1 wherein said vent valve is closed when no activation signal is present.

19. The air bleed system of claim 6 wherein said vent valve is closed when no activation signal is present.

20. The air bleed system of claim 11 wherein said vent valve is closed when no activation signal is present.

* * * * *

UNITED STATES PATENT AND TRADEMARK OFFICE
CERTIFICATE OF CORRECTION

| | | |
|---|---|---|
| PATENT NO. | : 8,979,021 B2 | Page 1 of 1 |
| APPLICATION NO. | : 13/274379 | |
| DATED | : March 17, 2015 | |
| INVENTOR(S) | : Dhuri et al. | |

It is certified that error appears in the above-identified patent and that said Letters Patent is hereby corrected as shown below:

On the Title page:

Item (73)

Please change the Assignee's name from "Easton" to "Eaton".

In the Claims:

At column 7, claim number 6, line number 7, please insert the word --mode-- after the word "flight".

It should read, "in an adverse flight mode;"

Signed and Sealed this
Twenty-first Day of July, 2015

Michelle K. Lee
*Director of the United States Patent and Trademark Office*